United States Patent
Narisawa

[19]
[11] Patent Number: 5,904,239
[45] Date of Patent: May 18, 1999

[54] ROLLER CONVEYOR SYSTEM

[76] Inventor: Ryo Narisawa, c/o HYAC Corporation 48511 Warm Springs Blvd., Fremont, Calif. 94539

[21] Appl. No.: 08/753,062
[22] Filed: Nov. 19, 1996
[51] Int. Cl.$^6$ ................................................. B65G 13/06
[52] U.S. Cl. .......................................... 198/783; 198/788
[58] Field of Search ........................ 198/781.01, 783, 198/788

[56] References Cited

U.S. PATENT DOCUMENTS

| 1,725,740 | 8/1929 | Schulte | 198/788 |
| 3,980,170 | 9/1976 | Jakes et al. | 198/788 X |
| 4,593,810 | 6/1986 | Look | 198/781.01 |

FOREIGN PATENT DOCUMENTS

| 3215921 | 11/1983 | Germany | 198/788 |
| 3827903 | 2/1990 | Germany | 198/783 |

*Primary Examiner*—James R. Bidwell
*Attorney, Agent, or Firm*—Majestic, Parsons Siebert & Hsue P.C.

[57] ABSTRACT

A roller conveyor has drive rollers individually connected to a stepping motor and idler rollers arranged longitudinally in two rows. The conveyor is divided longitudinally into a plurality of sections, each section being provided with a sensor and one of control cards that are sequentially connected and can exchange signals such that objects can be transported longitudinally on these rollers from one section to the next without colliding each other. Each drive roller has a wear-resistant lining around the drive shaft of the associated stepping motor such that the drive rollers can start and stop rotation gradually even if the associated motors are started or stopped abruptly.

20 Claims, 8 Drawing Sheets

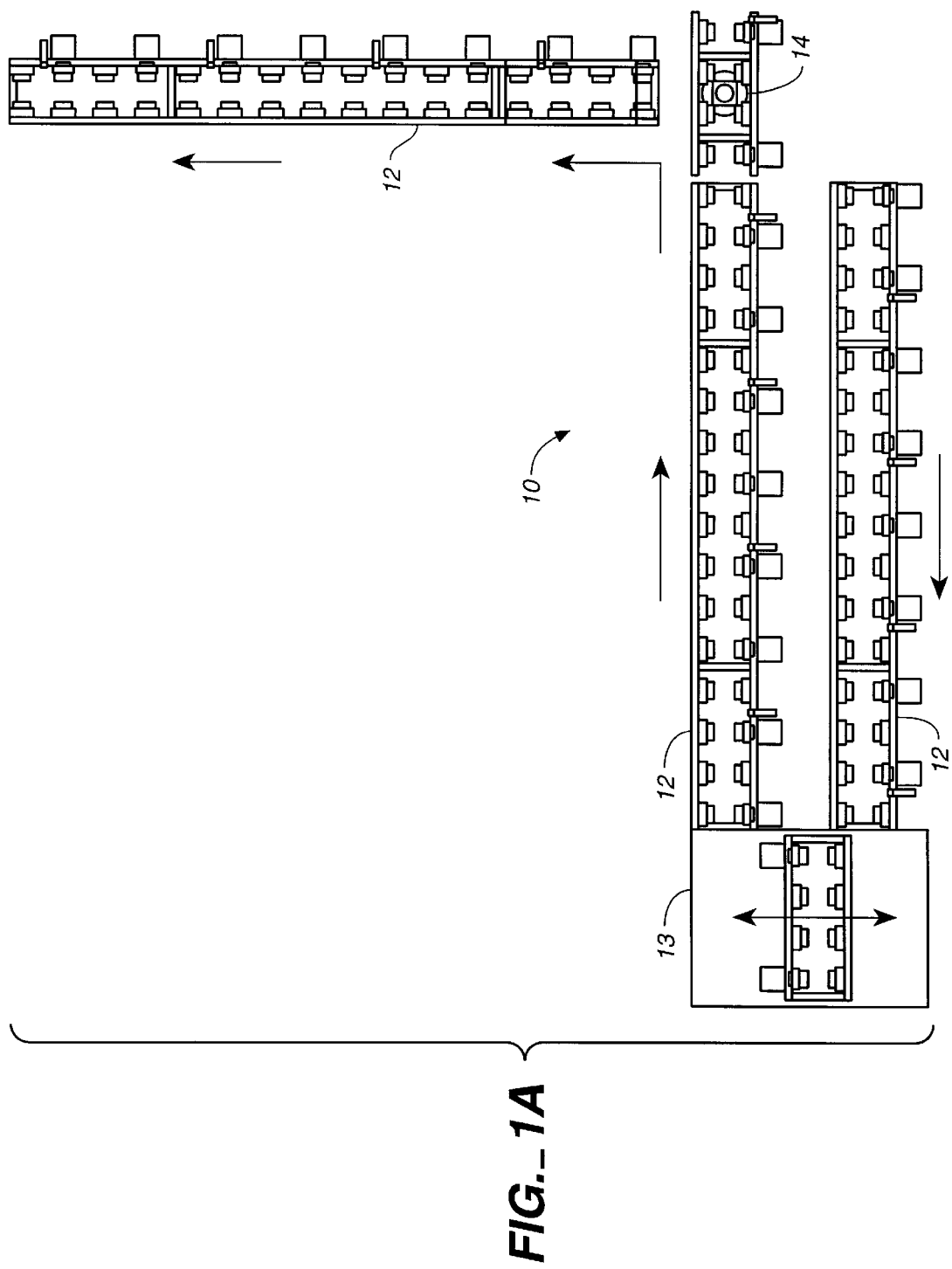
FIG._1A

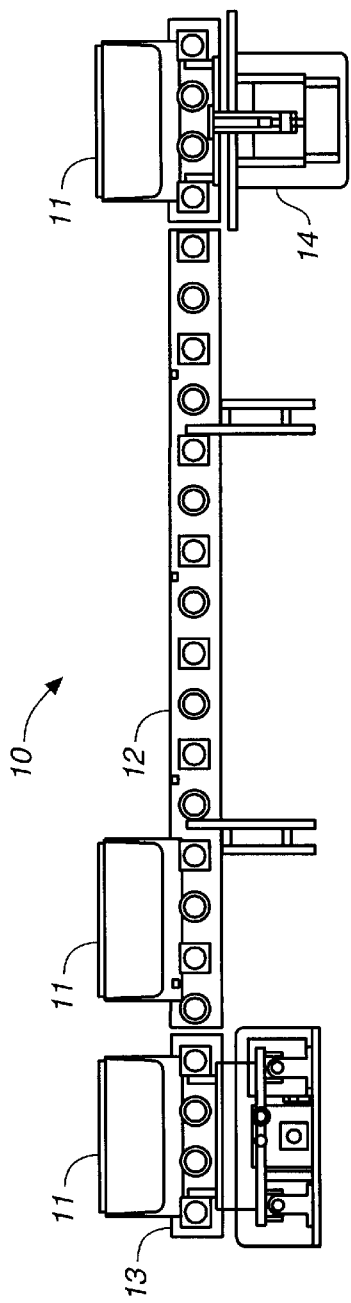
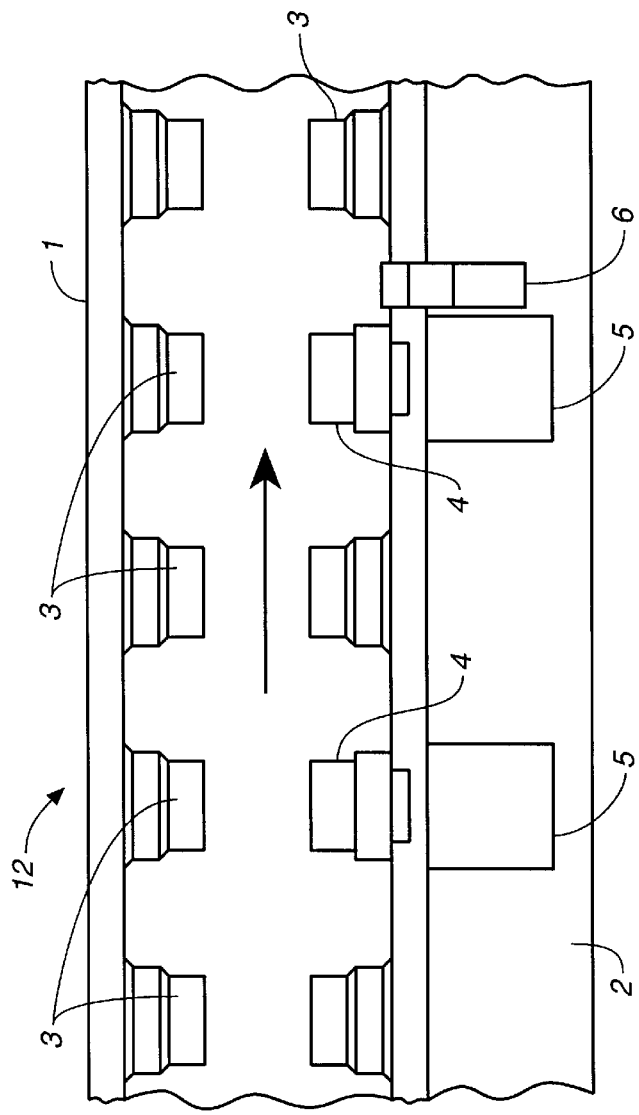

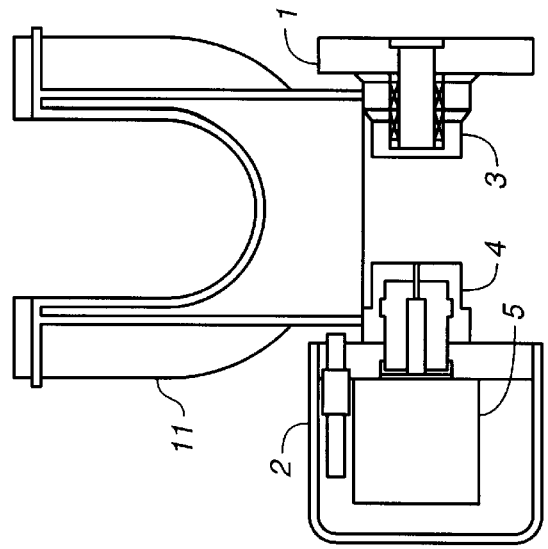
FIG._2C
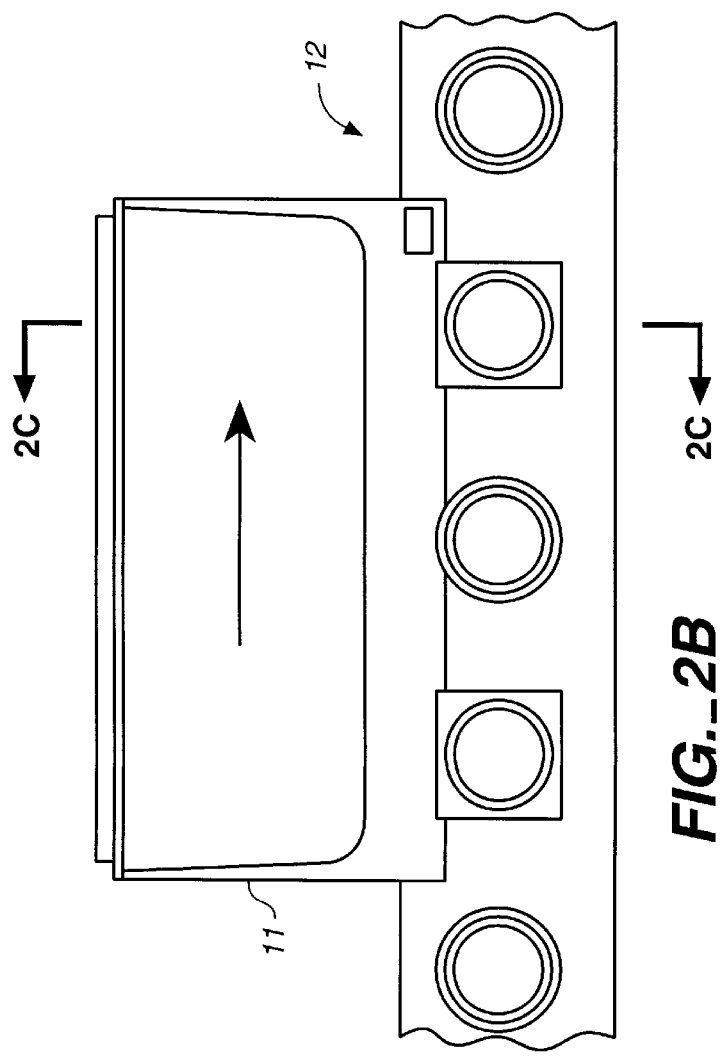
FIG._2B

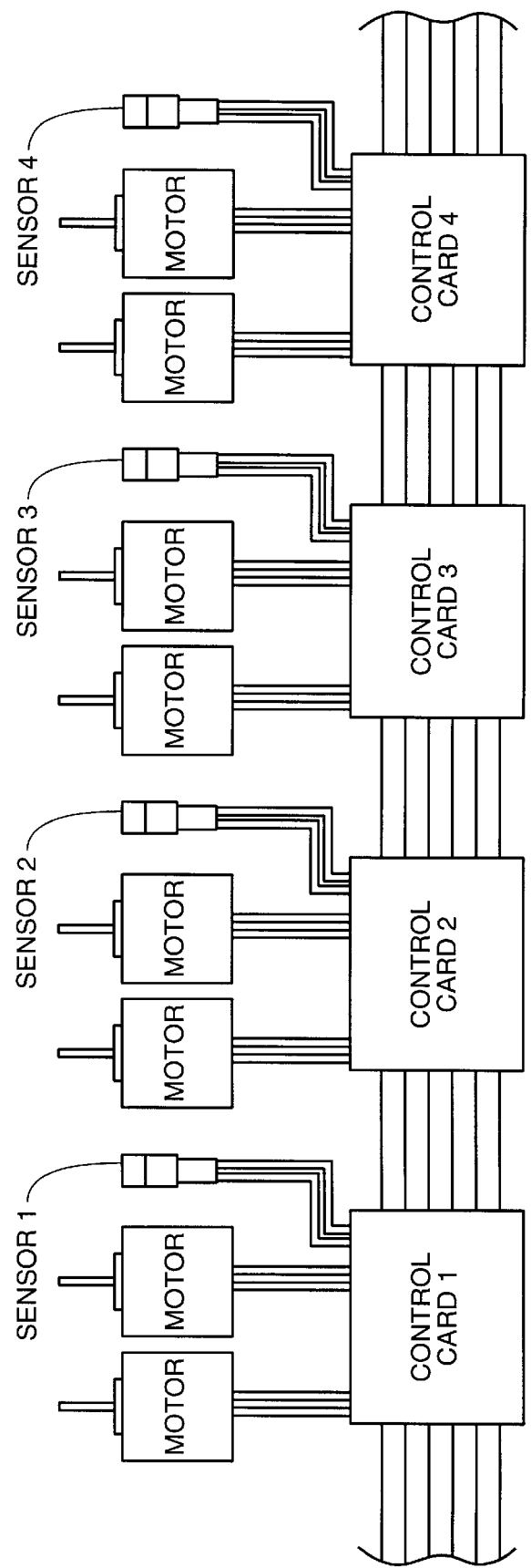
FIG._3

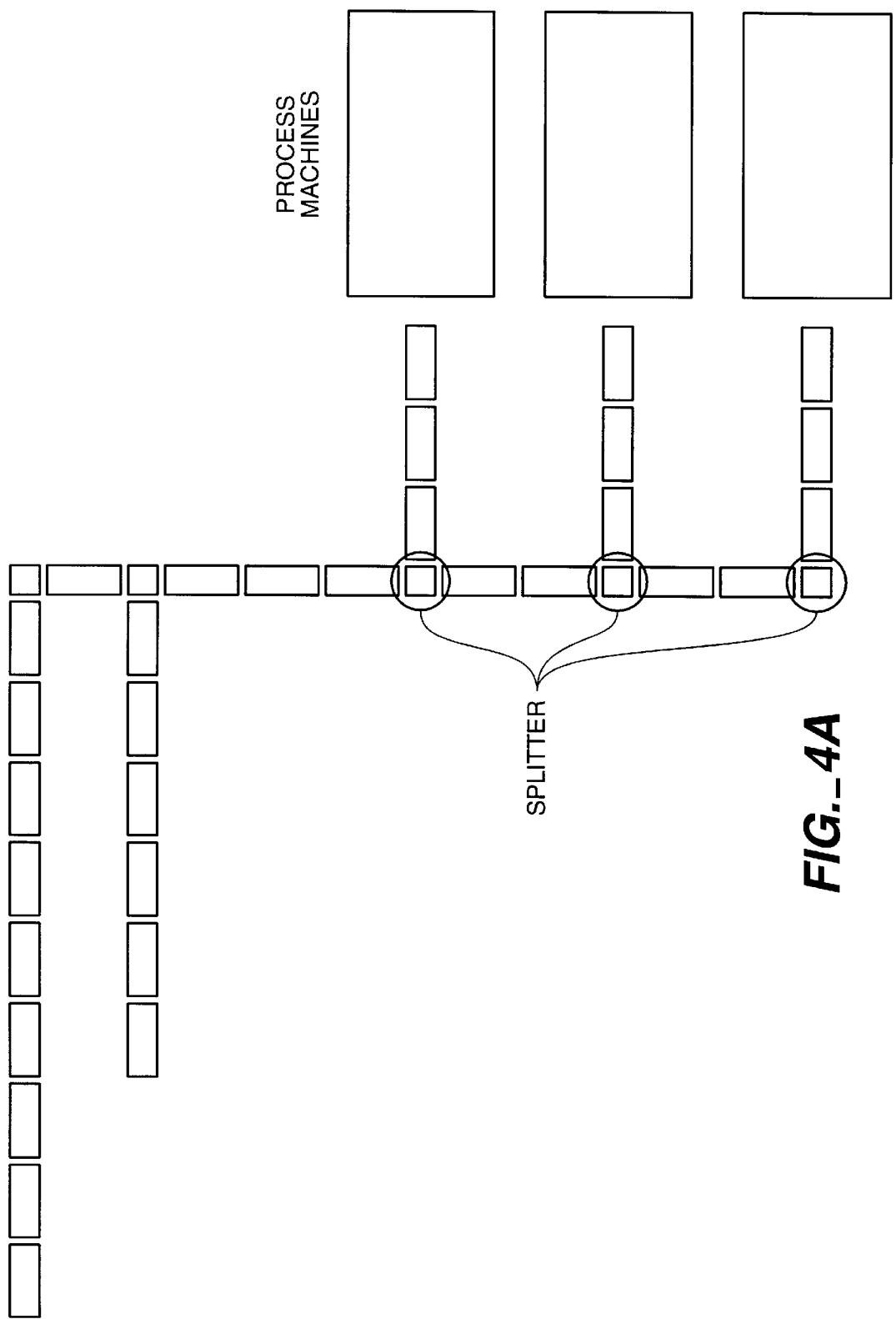
FIG._4A

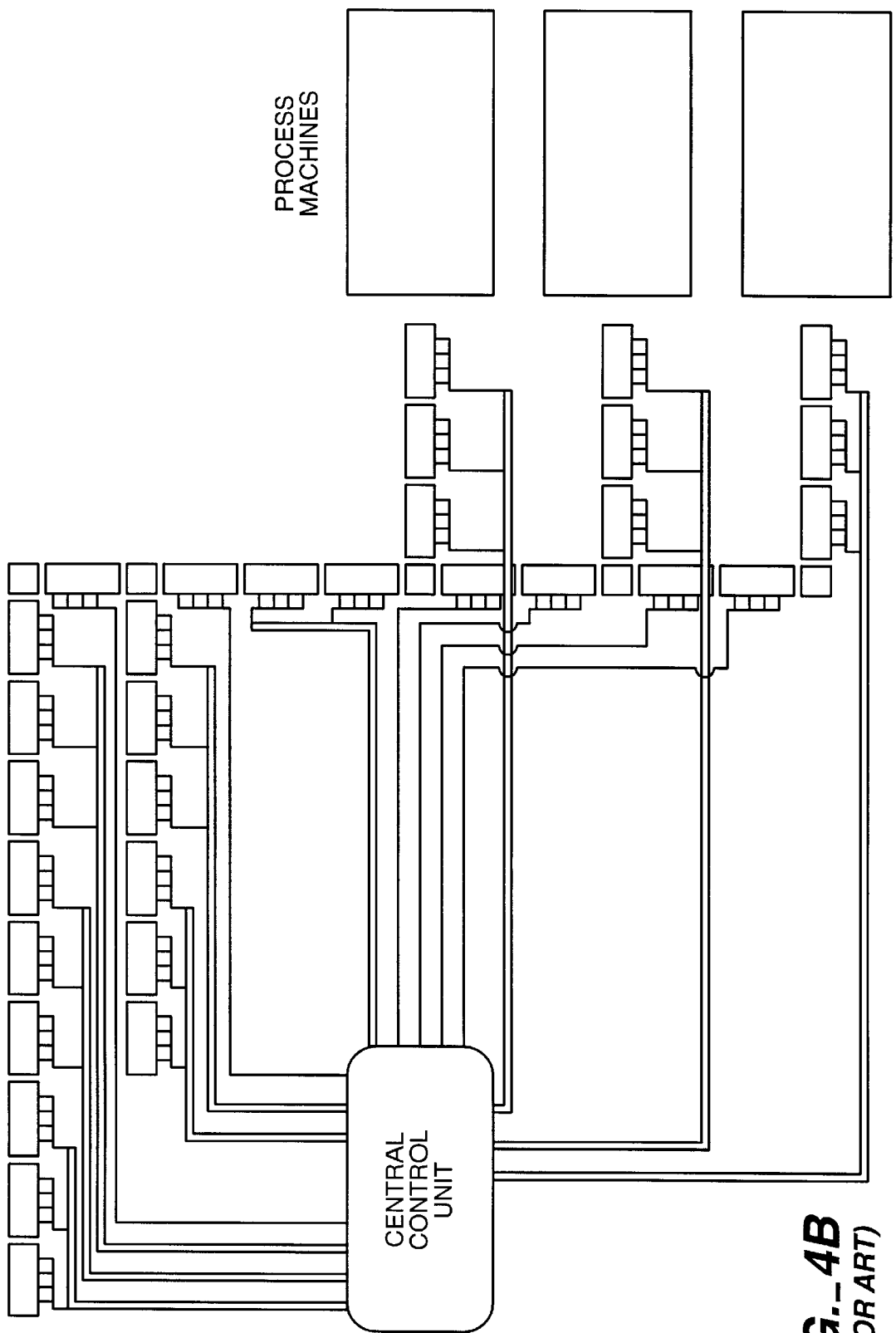
FIG._4B
(PRIOR ART)

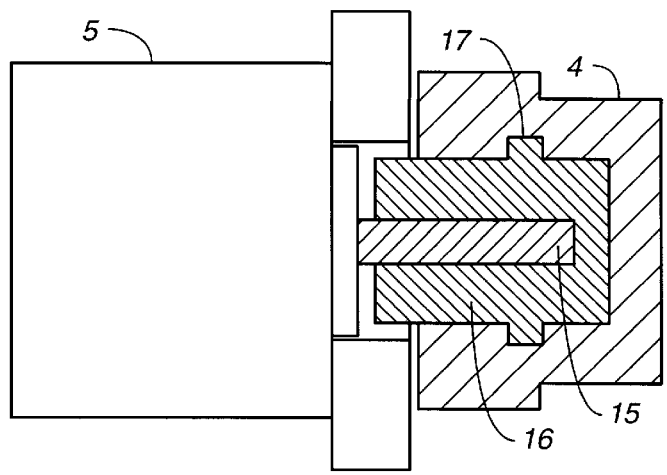
FIG._5
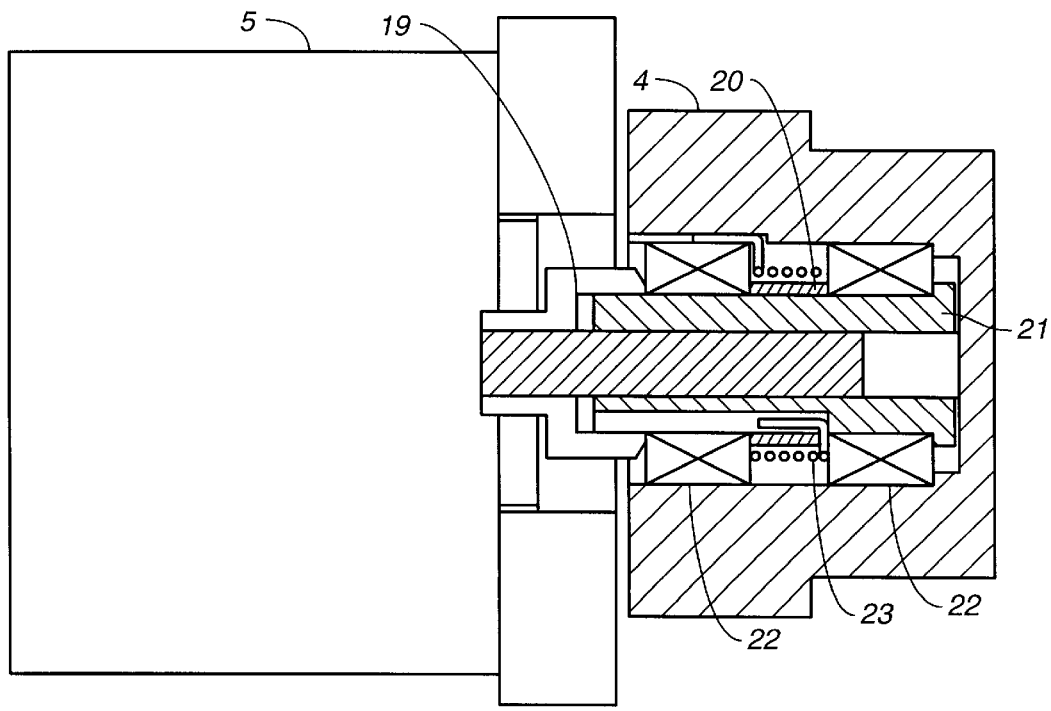
FIG._6

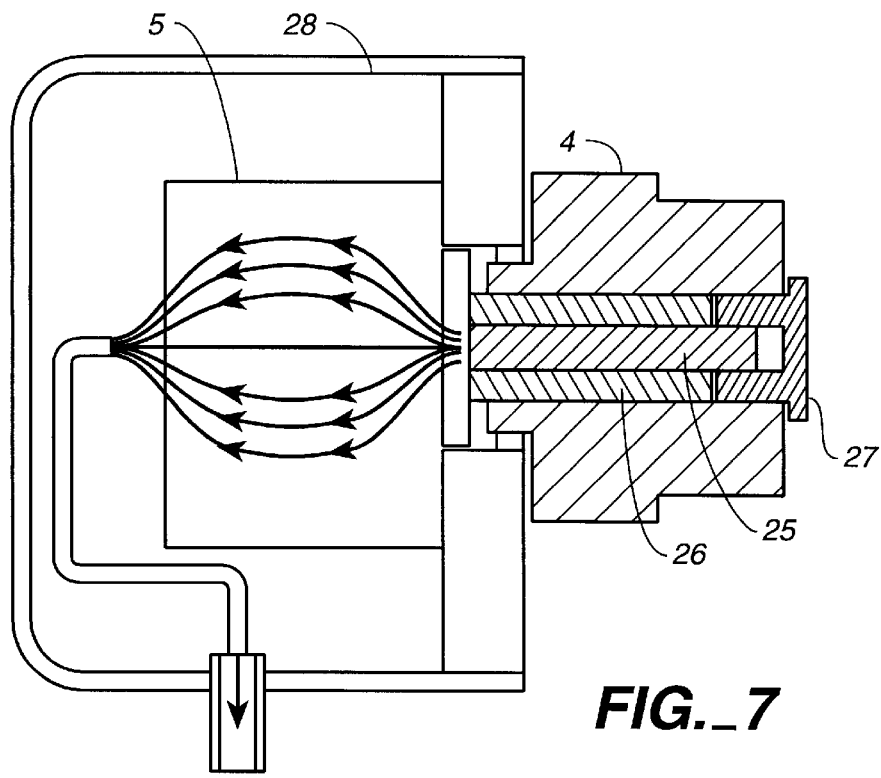
FIG._7
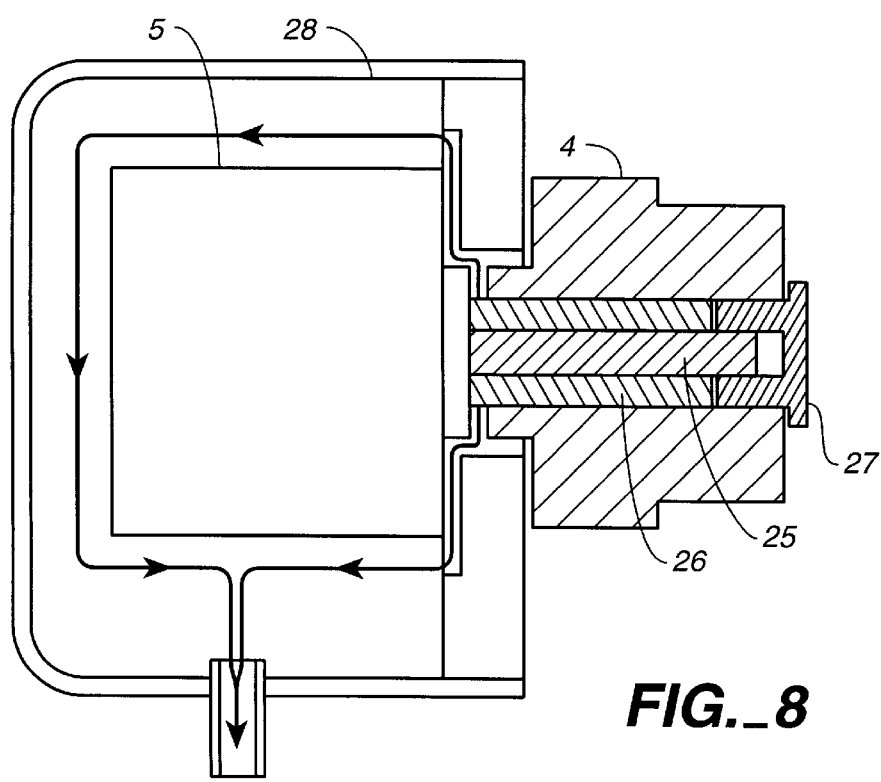
FIG._8

ROLLER CONVEYOR SYSTEM

BACKGROUND OF THE INVENTION

This invention relates to roller conveyors for transporting objects such as silicon wafers or memory disks in cassettes, as well as control systems for such roller conveyors.

Conveyors of various types have been developed, including belt conveyors, roller conveyors and conveyors with a combination of both belts and rollers which are driven by motors. Each type of conveyor serves a specific purpose and modifications are constantly being introduced to eliminate various deficiencies and also to meet specific requirements or needs. One of the drawbacks of prior art conveyors is that they are costly. Typical prior art belt or roller conveyors utilize complex control systems incorporating a complex and heavy wiring system lacking the intelligence of transferring objects such that collisions or chafting of objects may occur frequently, resulting in generation of contaminating particles. Thus, another of major drawbacks of prior art conveyors is their inability to maintain a clean environment free of small particles. In many industries, smoothness in movement of the objects and contamination control are key issues. For applications inside a cleanroom, generation of small particles due to slippage of a belt conveyor becomes a serious problem for maintaining a dust-free environment. For transporting delicate objects such as silicon wafers and memory disks, conveyors which start and stop abruptly can cause damage to the surfaces of the objects.

SUMMARY OF THE INVENTION

It is therefore an object of this invention to eliminate these problems of prior art roller conveyors by providing improved roller conveyors and control systems of such conveyors for cleanroom application such as for transporting silicon wafers and memory disks.

It is one of more specific objects of this invention to provide roller conveyors which can start and stop smoothly.

It is another more specific object of this invention to provide an intelligent yet inexpensive control system for such a roller conveyors.

It is still another more specific object of this invention to provide such roller conveyors which do not produce small particles.

A roller conveyor embodying this invention, with which the above and other objects can be accomplished, may be characterized as comprising drive rollers individually connected to a stepping motor, idler rollers and sensors. The conveyor is divided longitudinally into a plurality of sections such that objects are sequentially transported from one to the next of these sections. Each section is provided with a control card, serving as a simple control means. These control cards are sequentially connected in a signal exchanging relationship such that cassettes can be transported smoothly without colliding with each other. The drive roller has a wear-resistant lining with inner diameter larger than the outer diameter of the drive shaft of the associated stepping motor such that torque is transmitted according to the load on the drive roller. In this manner, the drive rollers can start and stop rotation gradually even if the associated motors are started or stopped abruptly, preventing sudden changes in the travel speed of the object such as a cassette and hence damage to the silicon wafers and memory disks on such a cassette. Air passages may be provided through the motor or cover of the conveyor such that small particles that may be generated between the wear-resistant lining and the drive shaft of the motor can be effectively removed.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIGS. 1A and 1B are respectively a plan view and a side view of a roller conveyor system embodying this invention;

FIG. 2A is a plan view of a portion of a linear conveyor unit of FIGS. 1A and 1B, FIG. 2B is its side view with a cassette thereon, and FIG. 2C is a sectional view taken along line 2C—2C of FIG. 2B;

FIG. 3 is a block diagram of a control system of each of the linear conveyor units;

FIG. 4A is a block diagram of cable connections for controlling the system shown in FIG. 1A, and FIG. 4B is a block diagram of prior art cable connections for a comparable prior art system of conveyors;

FIG. 5 is a sectional view of a mechanism for connecting a drive roller to a motor associated therewith; and FIGS. 6, 7 and 8 are sectional views of other mechanisms for connecting a drive roller to a motor associated therewith.

Throughout herein, components that are equivalent or substantially similar are indicated by the same numerals and not repetitiously explained.

DETAILED DESCRIPTION OF THE INVENTION

FIGS. 1A and 1B show an example of roller conveyor system 10 embodying the invention, having three linear conveyor units 12 with two of them arranged parallel to each other and the third disposed perpendicularly thereto, a shuttle unit 13 for transferring objects transversely from one end of one of the parallel conveyor units 12 to one end of the other of the parallel conveyor units 12, and a 90-degree turning unit 14 for transferring objects from one of the mutually parallel conveyor units to the perpendicular one. As more clearly shown in FIG. 2A, each of the linear conveyor units 12 has drive rollers 4, each connected to a stepping motor 5, and idler rollers 3 which are rotatably supported by two frame bars 1 and 2 and accurately aligned in two longitudinal rows, one of the rows having only idler rollers 3 and the other row having idler rollers 3 and drive rollers 4 alternately. A plurality of sensors 6 are provided for detecting the presence or absence of a cassette 11. According to the embodiment shown in FIGS. 1A and 1B, each modular linear conveyor unit 12 is 40 inches long, consisting of four 10-inch sections each including two of the drive rollers 4 and one of the sensors 6 adapted to detect the presence or absence of an object in the corresponding section.

As shown schematically in FIG. 3, each of these four sections is controlled by a corresponding one of four control cards, each serving as a compactly designed control unit. These four control cards are sequentially connected by lines which are internally contained within the body of the conveyor unit 12 such that each mutually adjacent pair of these cards is in mutually signal-exchanging relationship without leaving any wire hanging externally. Each card is also connected to the sensor 6 associated with the same section and is adapted to receive signals from it and to control the operation of the associated motors 5 of the section.

The control logic of each card may be as shown in Table 1 wherein "Sensor ON" and "Sensor OFF" respectively indicate that the sensor associated with the section controlled by that card is indicating the presence or absence of a cassette in that section. "Request out" is a signal transmitted to the card for the adjacent section on the upstream side, requesting for the shipment of a cassette and "Request in" is a signal received from the card for the adjacent section on the downstream side requesting for the shipment of a cassette. The bottom line of Table 1 means that a request for shipment of the next cassette is automatically outputted (Request out=ON) whenever the sensor for the section detects the absence of cassette (Sensor OFF) in that section, indicating that the section is ready to receive a new cassette.

TABLE 1

|  | Request in (ON) | | Request in (OFF) | |
| --- | --- | --- | --- | --- |
|  | Sensor ON | Sensor OFF | Sensor ON | Sensor OFF |
| Motors | ON | ON | OFF | ON |
| Request out | OFF | ON | OFF | ON |

This control logic is characterized in that the motors are kept running except when there is a cassette (Sensor ON) in the section and there is no request for its shipment from the section on the downstream side. Besides, the absence of request means the presence of a cassette in the section on the downstream side and collision must be avoided by not sending off the cassette at hand to the downstream side.

The control logic of each card may alternatively be as shown in Table 2 which is similar to the one described above with reference to Table 1 but is different wherein the motors in a section are stopped (Motors OFF) when there is no cassette either in the same section or in the adjacent section on its upstream side (Upstream Sensor OFF and Sensor OFF) even if there is a request for a cassette from the adjacent section on the downstream side (REQ IN (ON)). In other respects, the control logic according to Table 2 is the same as that shown in Table 1. In other words, if no request signal is received from the downstream side, it can be understood that there is a cassette in the adjacent section on the downstream and hence no cassette should be sent downstream so that no collision will occur.

TABLE 2

|  | Request in (ON) | | | Request in (OFF) | | |
| --- | --- | --- | --- | --- | --- | --- |
|  | | Sensor OFF | | | Sensor OFF | |
|  | Sensor ON | Upstream sensor OFF | Upstream sensor ON | Sensor ON | Upstream sensor OFF | Upstream sensor ON |
| Motors | ON | ON | OFF | OFF | ON | OFF |
| Request | OFF | ON | ON | OFF | ON | ON |

The shuttle unit and the 90-degree turning unit shown respectively at 13 and 14 in FIGS. 1A and 1B are also provided with drive rollers each connected to a stepping motor, idler rollers and sensors like one of the sections of the linear roller conveyor 12 described in detail above. The shuttle unit 13 is characterized as being adapted to move a cassette transversely, together with the rollers which support it. The 90-degree turning unit 14 is characterized as being adapted to turn a cassette by 90 degrees, together with the rollers which support it. The mechanisms for transverse and rotational motions of these units are not different from prior art units for the same purposes and hence will not be explained.

Both the shuttle unit 13 and the 90-degree turning unit 14 according to this invention are controlled by a simple relay or transistor logic control unit (not shown). The shuttle unit 13 will be referred to as being in its first position when it is aligned with the linear conveyor unit on its upstream side and in its second position when it is aligned with the linear conveyor unit on its downstream side. The control unit for the shuttle unit 13, when the unit is in the first position, will activate the motors according to its control logic similar to those described above with reference to Tables 1 and 2, thereby rotating the drive rollers to bring in a cassette. When the presence of the cassette on the shuttle unit 13 is detected by its sensor, the drive rollers are stopped and the shuttle unit 13 is moved from its first position to its second position. After it reaches its second position, the drive rollers are started again in the direction of the adjacent linear conveyor unit 12 on the downstream side, transporting away the cassette. After the departure of the cassette from the shuttle unit 13 is ascertained by the sensor, the motors for the drive rollers are stopped and the shuttle unit 13 is moved back to the first position, thereby concluding a cycle of its operations.

The control logic for the 90-degree turning unit 14 is similar. Let the first position of the 90-degree turning unit 14 be that at which it aligns with the adjacent linear conveyor unit 12 on the upstream side from which it is adapted to receive cassettes and the second position be that at which it is aligned with the adjacent linear conveyor unit 12 on the downstream side to which it is adapted to transport received cassettes. The control unit for the turning unit 14, when it is in the first position, will activate the motors according to its control logic similar to those described above with reference to Tables 1 and 2, thereby rotating the drive rollers to bring in a cassette. When the presence of the cassette on the turning unit 14 is detected by its sensor of the unit, the drive rollers are stopped and the turning unit 14 is rotated by 90 degrees from its first position to its second position. After it reaches its second position, its rotary motion is stopped, and the drive rollers are started again in the direction of the adjacent linear conveyor unit 12 on the downstream side, transporting away the cassette. After the departure of the cassette from the turning unit 14 is ascertained by the sensor, the motors for the drive rollers are stopped, and the turning unit 14 is rotated back to the first position, thereby concluding a cycle of its operations.

The linear, shuttle and turning units 12, 13 and 14 according to this invention can be easily connected together to form a system such as shown in FIG. 4A with splitters, and all signal-carrying wires and cables between pairs of the control units can be contained internally. FIG. 4B shows a comparable system using prior art components controlled by one central control unit which must be connected individually by externally exposed wires and cables to the motors for drive rollers disposed along the path for objects to be transported thereby. Connections of individual units according to this invention are advantageous in that use is made of simple control units for individual sections, that is, each section has a control unit with intelligence of its own while simple communications are effected among the mutually adjacent pairs of these control units.

FIG. 5 shows more in detail a mechanism for attaching each of the drive rollers 4 to a corresponding one of the motors 5. The drive roller 4, according to this embodiment, is made of a soft polyurethane rubber and mounted on a hard plastic insert 16 which, in turn, is mounted on the drive shaft 15 of the motor 5. A groove and a protrusion 17 on the contact surfaces of the drive roller 4 and the hard plastic insert 16 serve to lock them with respect to each other and to thereby prevent slippage between the insert 16 and the rubber roller 4. This mechanism permits transmission of high torque with no slippage between the drive shaft 15 of the motor 5 and the drive roller 4.

FIG. 6 shows another mechanism for the attachment of a drive roller 4 to the drive shaft of the corresponding motor 5, characterized as using two bearings 22 and a spring 23. One end of the spring 23 is affixed to the inner wall of the drive roller 4, and the other end is affixed to the outer wall of the drive shaft inside a lining insert 21. An annular spacer 20 is disposed between the bearings 22 to keep the separation therebetween, serving also to attenuate their vibrations. With a mechanism thus structured, the roller 4 does not stop suddenly when the motor 5 is stopped but stops gradually by "unwinding" the spring 23 in the direction of the drive. After a full stop, there is a winding of the spring 23 in the reverse direction for a complete stop. When the motor 5 starts rotating, the roller 4 starts its rotation gradually in a similar manner.

FIGS. 7 and 8 show alternative mechanisms for allowing the drive roller 4 to gradually start and stop its rotary motion. The mechanism shown in FIG. 7 is characterized as causing the drive shaft 25 of the motor 5 to rotate inside a wear-resistant lining 26, serving as an insert for the drive roller 4. The internal diameter of the lining 26 is slightly larger than the external diameter of the drive shaft 25 such that transmission of torque will depend on the load on the drive roller 4. When the load is sufficiently large, the roller 4 will start to rotate. Even if the motor 5 is stopped suddenly, the drive roller 4 will come to a gradual stop due to the internal slippage between the drive shaft 25 and the lining 26.

One drawback of mechanisms using such a lining is the possible generation of small particles due to the friction between the drive shaft 25 and the lining 26. An air drain passage is therefore provided to remove small particles that may be generated. In FIGS. 7 and 8, routes of air flow through such an air drain passage are schematically indicated by arrows. FIG. 7 shows an example whereby the motor 5 is enclosed by a cover 28 having an opening connected to a vacuum pump (not shown) such that an air passage is formed through the motor 5. FIG. 8 shows another example whereby an air passage is formed through the space between the motor 5 and the cover 28.

The invention has been described above with reference to only a limited number of embodiments but these examples are intended to be illustrative. Such modifications and variations on the illustrated examples that may be apparent to a person skilled in the art are intended to be within the scope of this invention.

What is claimed is:

1. The roller conveyor for transporting objects longitudinally from an upstream end to a downstream end, comprising:

a plurality of longitudinally arranged drive rollers for having said objects placed thereupon and transporting said objects longitudinally;

individual motors each associated with and connected to a corresponding one of said drive rollers, said roller conveyor being longitudinally divided into a plurality of sections, each of said sections having at least one of said drive rollers;

sensors for detecting said objects and outputting detection signals accordingly, each of said sections having a corresponding one of said sensors;

sequentially connected control units each associated with one of said sections, each mutually adjacent pair of said control units being in mutually signal-exchanging relationship, each of said control units being adapted to cause the corresponding one of said drive rollers to rotate or stay stationary according to the detection signal from the corresponding one of said sensors and signals from the adjacent ones of said control units; and idler rollers which are not connected to any motors and are also adapted to have said objets placed thereupon and to transport said objects longitudinally, said idler rollers and sais drive rollers being arranged lingitudinally in two rows, one of said two rows containing only idler rollers, the other of said rows having said idler rollers and said drive rollers arranged alternately.

2. The roller conveyor of claim 1 wherein said motors are stepping motors.

3. The roller conveyor of claim 1 wherein said control units are each adapted to output a request signal to the adjacent one of said control units on the upstream side and to activate said motors of the associated section if a request signal is received from the adjacent one of said control units on the downstream side and if the corresponding sensor indicates that one of said objects is in the corresponding section.

4. The roller conveyor of claim 1 wherein said control units are each adapted to keep stationary the motors for the corresponding section which is associated therewith if said detection signals indicate the presence of an object in the adjacent section on the downstream side of said corresponding section.

5. The roller conveyor of claim 1 wherein said control units are each adapted to output a request signal to the adjacent one of said control units on the upstream side and to activate said motors of the associated section if a request signal is received from the adjacent one of said control units on the downstream side.

6. The roller conveyor for transporting objects longitudinally from an upstream end to a downstream end, comprising:

a plurality of longitudinally arranged drive rollers for having said objects placed thereupon and transporting said objects longitudinally;

individual motors each associated with and connected to a corresponding one of said drive rollers, said roller conveyor being longitudinally divided into a plurality of sections, each of said sections having at least one of said drive rollers, each of said motors having a drive shaft and each of said drive rollers including a connecting mechanism for connecting to the associated one of said motors so as to start and stop rotating gradually when said associated motor starts and stops abruptly, said connecting mechanism including bearings between said drive roller and said drive shaft and a spring with one end affixed to said drive roller and the other end affixed to a lining in contact with said drive shaft;

sensors for detecting said objects and outputting detection signals accordingly each of said sections having a corresponding one of said sensors; and sequentially connected control units each associated with one of said sections each mutually adjacent pair of said control units being in mutually signal-exchanging relationship each of said control units being adapted to cause the corresponding one of said drive rollers to rotate or stay stationary according to the detection signal from the corresponding one of said sensors and signals from the adjacent ones of said control units.

7. The roller conveyor of claim 6 wherein said motors are stepping motors.

8. The roller conveyor of claim 6 wherein said control units are each adapted to keep stationary the motors for the corresponding section which is associated therewith if said detection signals indicate the presence of an object in the adjacent section on the downstream side of said corresponding section.

9. The roller conveyor of claim 6 wherein said control units are each adapted to output a request signal to the adjacent one of said control units on the upstream side and to activate said motors of the associated section if a request signal is received from the adjacent one of said control units on the downstream side and if the corresponding, sensor indicates that one of said objects is in the corresponding section.

10. The roller conveyor of claim 6 wherein said control units are each adapted to output a request signal to the adjacent one of said control units on the upstream side and to activate said motors of the associated section if a request signal is received from the adjacent one of said control units on the downstream side.

11. The roller conveyor for transporting objects longitudinally from an upstream end to a downstream end, comprising:

a plurality of longitudinally arranged drive rollers for having said objects placed thereupon and transporting said objects longitudinally;

individual motors each associated with and connected to a corresponding one of said drive rollers, said roller conveyor being longitudinally divided into a plurality of sections, each of said sections having at least one of said drive rollers, each of said motors having a drive shaft and each of said drive rollers including a connecting mechanism for connecting to the associated one of said motors so as to start and stop rotating gradually when said associated motor starts and stops abruptly, said connecting mechanism including wear-resistant lining with inner diameter larger than outer diameter of said drive shaft;

sensors for detecting said objects and outputting detection signals accordingly, each of said sections having a corresponding one of said sensors; and sequentially connected control units each associated with one of said sections, each mutually adjacent pair of said control units being in mutually signal-exchanging relationship, each of said control units being adapted to cause the corresponding one of said drive rollers to rotate or stay stationary according to the detection signal from the corresponding one of said sensors and signals from the adjacent ones of said control units.

12. The roller conveyor of claim 11 wherein said drive shaft can transfer torque to the corresponding one of said drive rollers according to the load on said corresponding drive roller.

13. The roller conveyor of claim 11 further comprising an air passage for removing small particles generated from said wear-resistant lining.

14. The roller conveyor of claim 11 wherein said motors are stepping motors.

15. The roller conveyor of claim 11 wherein said control units are each adapted to keep stationary the motors for the corresponding section which is associated therewith if said detection signals indicate the presence of an object in the adjacent section on the downstream side of said corresponding section.

16. The roller conveyor of claim 11 wherein said control units are each adapted to output a request signal to the adjacent one of said control units on the upstream side and to activate said motors of the associated section if a request signal is received from the adjacent one of said control units on the downstream side and if the corresponding sensor indicates that one of said objects is in the corresponding section.

17. A roller conveyor system comprising a plurality of linear units and a shuttle unit which are connected sequentially for transporting objects thereon sequentially from an upstream end to a downstream end, each of said linear units comprising:

a plurality of longitudinally arranged drive rollers for having said objects placed thereupon and transporting said objects longitudinally;

individual motors each associated with and connected to a corresponding one of said drive rollers, said roller conveyor being longitudinally divided into a plurality of sections, each of said sections having at least one of said drive rollers;

sensors for detecting said objects and outputting detection signals accordingly, each of said sections having a corresponding one of said sensors; and sequentially connected control units each associated with one of said sections, each mutually adjacent pair of said control units being in mutually signal-exchanging relationship, each of said control units being adapted to cause the corresponding one of said drive rollers to rotate or stay stationary according to the detection signal from the corresponding one of said sensors and signals from the adjacent ones of said control units;

said shuttle unit having longitudinally arranged rollers and being adapted to move said objects transversely from one to another of said linear units which are parallel to each other from the upstream side to the downstream side.

18. The roller conveyor system of claim 17 wherein said shuttle unit includes a controller which controls operations of said shuttle unit and motions of said objects thereon such that said objects pass over said shuttle unit one at a time and that no collisions of said objects occur on said shuttle unit.

19. A roller conveyor system comprising a plurality of linear units and a turning unit which are connected sequentially for transporting objects thereon sequentially from an upstream end to a downstream end, each of said linear units comprising:

a plurality of longitudinally arranged drive rollers for having said objects placed thereupon and transporting said objects longitudinally;

individual motors each associated with and connected to a corresponding one of said drive rollers, said roller conveyor being longitudinally divided into a plurality of sections, each of said sections having at least one of said drive rollers;

sensors for detecting said objects and outputting detection signals accordingly, each of said sections having a corresponding one of said sensors; and sequentially connected control units each associated with one of said sections, each mutually adjacent pair of said control units being in mutually signal-exchanging relationship, each of said control units being adapted to cause the corresponding one of said drive rollers to rotate or stay stationary according to the detection signal from the corresponding one of said sensors and signals from the adjacent ones of said control units;

said turning unit having longitudinally arranged rollers and being adapted to move said objects from one to another of said linear units which are perpendicular to each other.

20. The roller conveyor system of claim 19 wherein said turning unit includes a controller which controls operations of said turning unit and motions of said objects thereon such that said objects pass over said turning unit one at a time and that no collisions of said objects occur on said turning unit.

* * * * *